United States Patent Office.

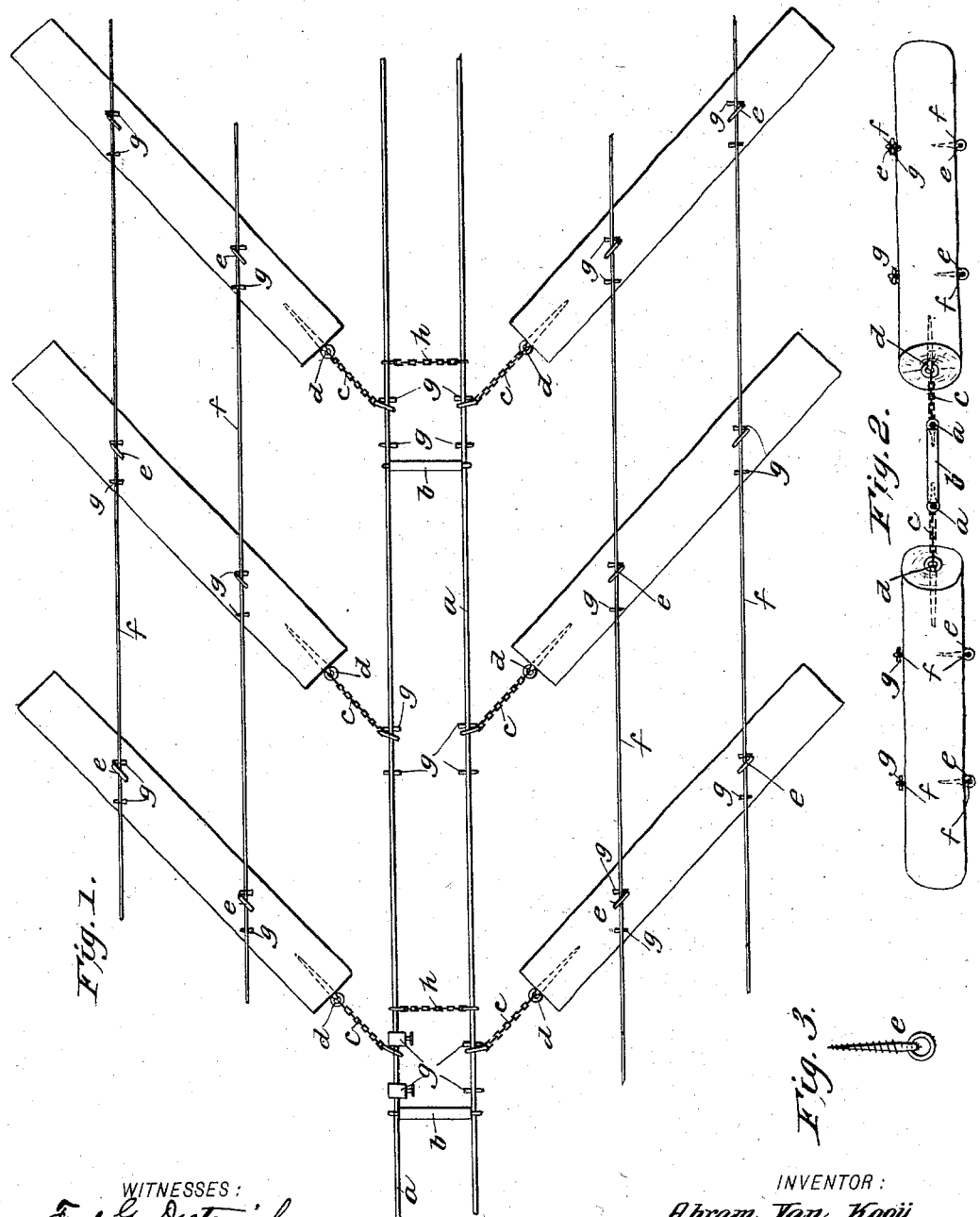

ABRAM VAN KOOŸ, OF HOLLAND, MICHIGAN.

RAFTING LOGS.

SPECIFICATION forming part of Letters Patent No. 476,106, dated May 31, 1892.

Application filed December 13, 1889. Serial No. 333,677. (No model.)

*To all whom it may concern:*

Be it known that I, ABRAM VAN KOOŸ, of Holland, county of Ottawa, and State of Michigan, have invented a new and Improved Means for Connecting Logs or Timbers for Forming Rafts and for Towing the Same, reference being had to accompanying drawings, in which I have represented my invention applied to logs forming a raft.

In said drawings, Figure 1 is a plan view showing my apparatus applied to logs as required to connect them for towing. Fig. 2 is a front view, and Fig. 3 shows a screw provided with a ring.

Similar letters refer to similar parts throughout the entire raft.

$a$ represents a tow-line.

$b$ represents a wooden block, at each end of which an iron bolt, with ring attached, is driven, through which the tow-lines pass, thus keeping the two rafts separate.

$c$ represents a chain or rope connecting the individual logs or timbers with the tow-line $a$.

$d$ represents a dog with a ring and swivel or a screw with a ring and swivel driven or screwed into the end of each log or timber, to which ring $c$ is fastened.

$e$ represents a dog with a ring and swivel or a screw with a ring and swivel driven or fastened into the top and bottom of each log or timber for the stay-lines to pass through.

$f$ represents stay-lines made of rope, wire, or chain running above and below the entire length of the raft, passing through $e$ in each log or timber, the entire construction of the bottom of the raft being the same as the top, excepting the clasps or thumb-screws fastened to $f$, as hereinafter described.

$g$ represents a clasp or thumb-screw fastened to $a$ on each side of $b$ and a short distance therefrom, so as to hold $b$ in place and at the same time give $b$ some play in the water, and also fastened to $a$ on each side of $c$, so as to prevent $c$ from slipping on $a$, and also fastened to $f$ on each side of $e$ above the logs or timbers only and a short distance therefrom, so as to keep the logs or timbers apart. Instead of this thumb-screw or clasp a strong hard-wood pin may be inserted through the tow-line, between the strands or links thereof, and placed in the same position as the thumb-screw or clasp above described.

$h$ represents a short rope or chain connecting the two tow-lines $a$ to prevent the two rafts from spreading too far apart.

To carry my invention into effect, two rafts are constructed and made up independent of each other. The tow-lines $a$ are then connected by the wooden blocks $b$, the length and size of which will be governed by the size of the raft to be towed. The object of said blocks is to prevent the two rafts from coming in contact. The rafts are further connected with a rope or chain $h$, which rope or chain prevents the raft from spreading. Each raft has a tow-line of heavy rope or chain $a$, by which it is towed. Four stay-lines $f$, or as many more as may be deemed necessary, are placed over and below the entire raft for the purpose of strengthening the same. As many stay-lines are placed below the raft as above the raft. These stay-lines pass through the dogs fastened into the logs or timbers $d$.

An iron clasp or thumb-screw or hard-wood pin $g$ is fastened to $a$ on each side of $b$, so as to hold $b$ in place, and also fastened to $a$ on each side of $c$, so as to prevent $c$ from slipping on $a$, and also fastened to the upper stay-lines, but not to the lower stay-lines $f$. If a hard-wood pin is used instead of the thumb-screw or clasp, it is inserted through the tow-lines between the strands or links thereof. Each log or timber is connected with the tow-lines $a$ by a short chain or rope $c$, one end of which rope or chain is fastened to $a$, and the other end is fastened to the ring of the dog fastened into the logs or timbers $d$. The ends of the stay-lines $f$ must be fastened to the first and last log or timber of each raft.

The following claims are made for this invention: First, large rafts of logs or timbers can be so constructed by means of this invention that they can be towed with safety on the ocean or the Great Lakes without danger of destruction through the action of the waves in times of storms and squalls; second, it is further claimed that by means of this invention a raft can be so constructed that the waves cannot strike the logs or timbers against each other and that each log or timber will remain separate and apart in the most turbulent waters and thereby insure safety to the raft; third, it is further claimed that by means of this invention a raft can be so constructed as to offer the least possible resistance to the water, and that a raft can be towed with less power and at a greater speed than by any method now known or in vogue.

Having thus described my invention, I claim—

1. The improved means for connecting logs for forming rafts and for towing such rafts, the same consisting of the tow-lines $a\ a$ and spacing-blocks $b$, secured to said lines, supplemental tow-chains $c$, attached to the tow-lines and adapted to extend laterally therefrom and having devices secured to their outer ends for connecting with a series of logs, the stay-lines $f$, and means for securing them to the logs, as shown and described.

2. In an apparatus for connecting logs to form rafts and for towing the latter, the combination, with the main tow-lines $a\ a$, spacing-blocks $b$, and connecting-ropes $h$, applied to said tow-lines, of the supplemental lateral tow-chains $c$, loosely connected with the main tow-lines and having devices secured to their outer ends for attachment to the logs, and a series of devices $g$ for limiting the movement of the chains $c$ on the tow-lines, all as shown and described.

Dated at Holland, Michigan, November 15, A. D. 1889.

ABRAM VAN KOOŸ.

Witnesses:
G. VAN SCHLEVEN,
GERRIT J. DIEKEMA.